(12) United States Patent
Bishop

(10) Patent No.: US 9,417,116 B2
(45) Date of Patent: Aug. 16, 2016

(54) WEIGHING METHOD AND APPARATUS

(75) Inventor: Kelvin Dennis Bishop, Staffordshire (GB)

(73) Assignee: Illinois Tool Works Inc., Glenview, IL (US)

( * ) Notice: Subject to any disclaimer, the term of this patent is extended or adjusted under 35 U.S.C. 154(b) by 1608 days.

(21) Appl. No.: 12/947,184

(22) Filed: Nov. 16, 2010

(65) Prior Publication Data

US 2011/0119028 A1    May 19, 2011

(51) Int. Cl.
*G01G 19/00* (2006.01)
*G01G 23/00* (2006.01)
*G01G 23/01* (2006.01)

(52) U.S. Cl.
CPC .......... *G01G 23/002* (2013.01); *G01G 23/015* (2013.01)

(58) Field of Classification Search
CPC .................. B60G 2204/1162; G01G 23/015; G01G 23/002
USPC .......................................... 702/154, 173, 174
See application file for complete search history.

(56) References Cited

U.S. PATENT DOCUMENTS

| | | | |
|---|---|---|---|
| 3,463,258 A | | 8/1969 | Meier |
| 3,713,333 A | * | 1/1973 | MacGeorge ............. 73/862.626 |
| 4,438,823 A | * | 3/1984 | Hussels et al. .......... 177/210 EM |
| 4,913,248 A | * | 4/1990 | Zakai ........................ 177/210 C |
| 5,050,034 A | * | 9/1991 | Hegner et al. ............. 361/283.4 |
| 5,717,167 A | | 2/1998 | Filing et al. |
| 5,929,389 A | * | 7/1999 | Keuper ......................... 177/141 |
| 6,137,065 A | | 10/2000 | Zefira |
| 7,761,258 B2 | * | 7/2010 | Brown .......................... 702/174 |
| 2003/0085060 A1 | * | 5/2003 | Becker et al. ................. 177/144 |
| 2008/0264141 A1 | * | 10/2008 | Kenmochi ..................... 73/1.08 |
| 2010/0289658 A1 | * | 11/2010 | Brown .......................... 340/665 |
| 2010/0300215 A1 | * | 12/2010 | Eilersen .................... 73/862.626 |

FOREIGN PATENT DOCUMENTS

| | | |
|---|---|---|
| CN | 101441102 A | 5/2009 |
| EP | 0407705 A1 | 1/1991 |
| EP | 1985977 A1 | 10/2008 |
| GB | 2127154 A | 4/1984 |
| JP | 58115327 A | 7/1983 |
| JP | 2001255216 A | 9/2001 |
| JP | 2007225366 A | 9/2007 |
| WO | 2004102134 A2 | 11/2004 |

OTHER PUBLICATIONS

Machine translation of Patent EP 0407705, Harms Paul Jan. 16, 1991.*

(Continued)

*Primary Examiner* — Sujoy Kundu
*Assistant Examiner* — Ricky Ngon
(74) *Attorney, Agent, or Firm* — Levenfeld Pearlstein, LLC

(57) ABSTRACT

The present invention provides a weighing apparatus comprising a load cell and an inclinometer and a method of weighing with and calibrating the weighing apparatus that tilt compensates for component parts of load cell readings that vary according to different relationships with load cell inclination. The present invention further provides a weighing apparatus and method of weighing with and calibrating the weighing apparatus that compensates for residual errors in a measured weight that has been pre-compensated for load cell inclination.

9 Claims, 3 Drawing Sheets

(56) References Cited

OTHER PUBLICATIONS

Figure 1:
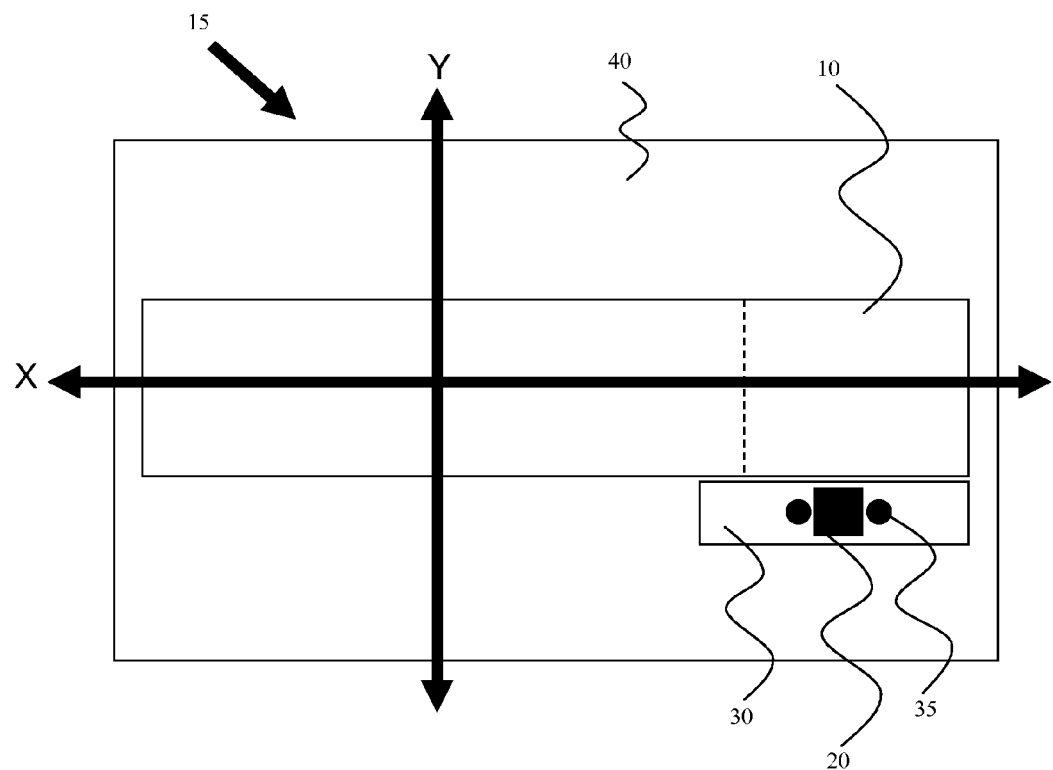

Machine translation of Patent JP 2007/225366, Hirata Toshiyuki Sep. 6, 2007.*

Machine translation of Patent GB 2127154, Knothe, Erich Aug. 25, 1983.*

European Search Report Issued in connection with European Patent App. No. EP 10160714.1 on Aug. 4, 2010.

* cited by examiner

WEIGHING METHOD AND APPARATUS

CROSS-REFERENCE TO RELATED APPLICATION DATA

This application is a continuation of U.S. patent application Ser. No. 12/759,595, filed Apr. 13, 2010.

FIELD OF THE INVENTION

The present invention relates to weighing apparatus. In particular the present invention is concerned with weighing scales (such as, although not exclusively, weighing scales for retail stores) and the effects on measured weight when the weighing scale is inclined from the horizontal.

RELATED ART

Weighing scales are widely used to accurately measure the weight of goods so that an appropriate price may be assigned to the specific measured weight of the goods. Modern weighing scales in retail stores and other venues that are required to accurately measure the weight of goods commonly use load cells to measure the weight of the goods. Typically a load cell comprises two sections, a first load-bearing section to which a weighing platform is attached and an anchoring section by which the load cell is attached to the scale or a base plate to be mounted into a scale. Load cells typically comprise one or more strain gauges that deform when an applied load is placed upon the scale. As the strain gauges deform they send out an initial electrical signal corresponding to an uncompensated weight value that shall hereinafter throughout the specification be referred to as the raw output or weight value Wa.

If at any time the weighing scale is tilted off horizontal, the raw value of weight of an applied load measured by the load cell becomes lighter than the actual weight if the applied load was measured on the horizontal. As such, weighing scales are commonly placed on flat surfaces and/or have mechanisms such as adjustable feet to level the scale if needed. However, despite being nominally located on flat surfaces, weighing scales in busy stores are often moved around and may often be knocked either deliberately or accidentally. For purposes of nomenclature and ease of understanding, terms such as 'horizontal' or 'level to the horizontal' throughout this application refer to the inclination level where a load cell measures the true weight of the applied load.

Weighing scales are often sold with a specified weighing accuracy and are often required by local or national laws to be accurate to within a specific tolerance. This can pose a problem as the errors in weight measurement when a scale is tilted can put a weighing scale that is nominally accurate when measuring on the horizontal out of tolerance if it is tilted off the horizontal. Furthermore, it is also commercially important for the retailer to keep the weighing scale as level as possible to the horizontal when performing a weight measurement as a lighter weight reading of goods from the load cell would mean that the customer would be paying a cheaper price for the goods than the true price if the goods were weighed on the horizontal.

Several documents describe various techniques and methods to compensate for the error in measured weight when a weighing apparatus is tilted. One of the most common techniques to compensate for tilt is to use an inclinometer to measure the inclination of the load cell in two different axes in the plane of the horizontal and then calculate from both of these inclination values a correction factor to compensate for the error in the raw weight.

One such document is patent document U.S. Pat. No. 6,137,065. This document describes an inclinometer either mounted next to or integrated with a load cell to compensate for the effects of tilt. In this document, when the inclinometer is integrated with the load cell, the load cell outputs an inclination corrected value. When the inclinometer is mounted on a base next to the load cell, the inclination information is output to a display that indicates which legs of the base unit of the weighing scale should be adjusted to bring the scale into a horizontal level.

Patent document U.S. Pat. No. 5,717,167 describes a weighing device carried on a waste truck. A clinometer is provided for detecting an out of level condition and output at least one angle signal. This angle signal is used to adjust the measured weight to provide an accurate weight reading of the load disposed on the scale with respect to tilt angle and is also used to proportionally calibrate the shear forces resulting from a load disposed on the scale of the truck with the amount of tilt detected by the clinometer.

Patent document WO2004/102134 describes a weighing system comprising a container and a load cell that is operable on a truck with load 'pick-up' ranges from typically 5000 to 50,000 pounds. A tilt sensor located in the container is used in the system so that the cab controller can compensate the load cell measurements when the truck is parked on sloping ground. The patent describes a method for calculating a 'pick-up' weight by taking and storing load cell and tilt sensor readings just before a load is added and using these readings as a baseline measure. The same process is repeated after the load has been added and the pick-up weight is calculated on the difference between the readings taken before and after the load was added. The aim is to factor out the initial weight of the container, but this is only achieved after measurements with and without the added load. Therefore the weighing system is not pre-calibrated so that only a single measurement need be taken for each applied load. This system of weight measurement therefore has to perform two measurements for each new pick-up reading to factor out the initial container weight. The system also aims to eliminate systematic errors such as truck chassis twisting by taking the pre and post load readings within a short time of each other.

SUMMARY OF THE INVENTION

The present invention is as set out in the appended claims.

The inventors of the present invention have identified the output data values from a load cell corresponding to the pre-existing weight of the weighing apparatus that must be correctly factored out in a weight measurement. When a measurement is made of an applied load, it is not only the mass, hence weight, of the container/platform that the load is located that has to be compensated for but also: the 'deadload' in the scale itself resulting from any fittings mechanically joining the platform to the load cell as well as part of the load cell itself; and any constant offsets introduced by electronics associated with the load cell that do not vary with tilt. The weight that the load cell is aiming to measure (not including the load applied to apparatus and any constant offsets) is referred to hereinafter throughout the application as the 'deadweight' of the weighing apparatus. Unlike the prior art, which seeks to globally tilt compensate each measured value of load, the present invention seeks to only tilt compensate for the component parts of the load cell output reading that actually vary with tilt and not tilt compensate for the component parts of the output reading that do not vary with tilt.

The present invention thus provides a method of calibrating a weighing apparatus comprising: a load cell; an inclinometer located in a defined position with respect to the load cell; the method comprising the steps of: measuring with the load cell in a first position a first value corresponding to at least a first weight value and a first further value; the first weight value varying with the inclination of the load cell according to a first inclination relationship; measuring with the inclinometer a first inclination value associated with the tilt of the load cell at the first position; measuring with the load cell in a second position a second value corresponding to at least a second weight value and a second further value; the second position at a different inclination than the first position; the second weight value varying with the inclination of the load cell according to the first inclination relationship; measuring with the inclinometer a second inclination value associated with the tilt of the load cell at the second position; comparing the first value and second value; deriving a parameter based upon a second inclination relationship between the further values and load cell inclination that is different to the first relationship.

The present invention further provides a method of weighing using a weighing apparatus comprising: a load cell; an inclinometer located in a defined position with respect to the load cell; the method comprising the steps of: measuring with the load cell a first value corresponding to at least: a value associated with a weight; and, a further value; the weight value varying with the inclination of the load cell according to a first inclination relationship; the further value varying with the inclination of the load cell according to a second inclination relationship that is different to the first inclination relationship; measuring with the inclinometer an inclination value associated with an inclination of the load cell; modifying the weight value in accordance with the first inclination relationship and the inclination value; calculating a second value based at least upon the further value and the modified weight value.

The present invention further provides a weighing apparatus comprising a load cell; an inclinometer located in a defined position with respect to the load cell; a storage means storing a parameter; the weighing apparatus comprising processing means operative to: receive a first load cell value corresponding to at least a value associated with a weight and a further value; the weight value varying with the inclination of the load cell according to a first inclination relationship; the further value varying with the inclination of the load cell according to a second inclination relationship that is different to the first inclination relationship; receive an inclination value from the inclinometer associated with an inclination of the load cell; modify the weight value based on the first inclination relationship and the inclination value; calculate a second value based at least on the further value and the modified weight value.

The present inventors have also found that compensating for deadweight and constant offsets may be achieved by deriving and storing pre-calibration data associated with the deadweight and constant offsets and subsequently using the same data in future load/weight measurements. Pre-calibrating a weighing apparatus to compensate for deadweight and constant offsets cuts down on the number of procedural steps needed to perform a weight measurement of an applied load and thus cuts down the overall measurement time.

The present inventors have also found that residual errors in measured weight still exist in tilt compensated weight readings. Although the deadweight and load tilt compensation reduces the magnitude of the error from that present in a raw weight measurement, residual error may still exist making the tilt compensated weight value to be out of specified accuracy ranges. Therefore, to obtain an accurate weight measurement, other tilt dependent error sources need to be compensated for other than load cell tilt and shear forces resulting from applied loads. These sources are those manifested in the load cell itself, such as bending moments, and arise when the load cell is tilted. The inventors have discovered that these residual errors follow approximate relationships relating tilt and applied load to residual error magnitude. By performing one or more calibration measurements to determine one or more of these relationships the present invention thus is able to be pre-calibrated and compensate for such residual errors. Thus the present invention provides a method of calibrating a weighing apparatus comprising: a load cell; an inclinometer located in a defined position with respect to the load cell; the method comprising the steps of: providing a first value associated with a weight of a first mass measured at a first inclination value; measuring with the load cell at a second inclination from a horizontal level a second value associated with the weight of the first mass; measuring with the inclinometer a second inclination value associated with the load cell at the second inclination; modifying the second value in accordance with at least a first inclination relationship and the second inclination value; calculating an error parameter based at least upon: a comparison of the first value and the modified second value; and, an error relationship between weight and load cell inclination.

The present invention further provides a method of weighing using weighing apparatus comprising: a load cell; an inclinometer located in a defined position with respect to the load cell; the method comprising the steps of: measuring with the load cell a first value corresponding to at least a weight value; the weight value varying with the inclination of the load cell according to a first inclination relationship; measuring with the inclinometer an inclination value associated with an inclination of the load cell; modifying the weight value in accordance with the first inclination relationship and the inclination value; calculating a second value based at least on the modified weight value; modifying the second value based at least upon an error parameter and the inclination value.

The present invention further provides a weighing apparatus comprising a load cell; an inclinometer located in a defined position with respect to the load cell; a storage means storing an error parameter; the weighing apparatus comprising processing means operative to: receive a first load cell value corresponding to at least a weight value; the weight value varying with the inclination of the load cell according to a first inclination relationship; receive an inclination value from the inclinometer associated with an inclination of the load cell; modify the weight value in accordance with the first inclination relationship and the inclination value; calculate a second value based at least on the modified weight value; modify the second value based at least upon an error parameter and the inclination value.

Other aspects of the present invention are as described in the claims.

LIST OF FIGURES

Figure 2:
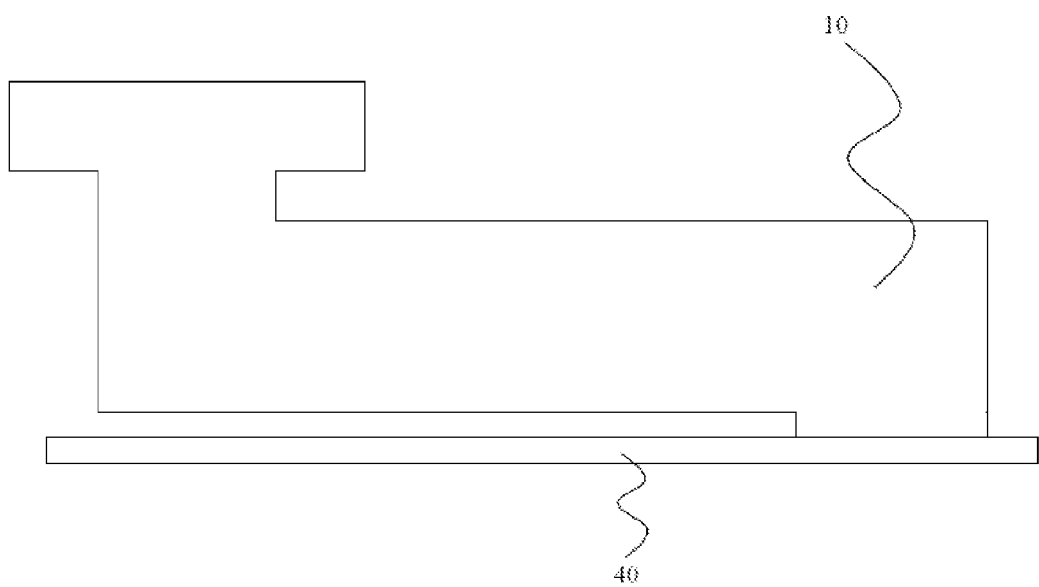
Figure 3:
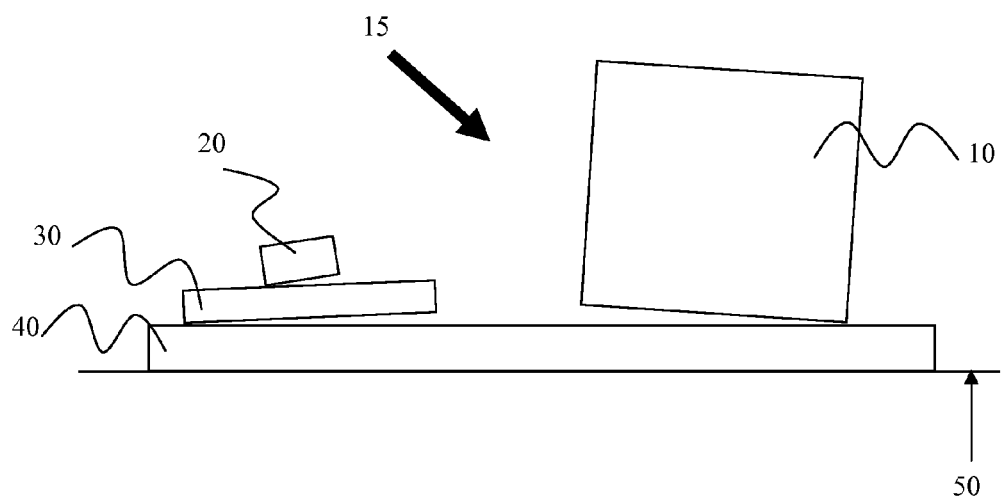

FIG. 1 shows a schematic plan view of a load cell.
FIG. 2 shows an elevation view of the load cell in FIG. 1.
FIG. 3 shows a side view of a load assembly for a weighing apparatus of the present invention.

DETAILED DESCRIPTION

The following describes a preferred example of how to embody different aspects of this invention. This example is not intended to limit the scope of the invention as it may be feasible to implement the present invention in other ways without departing from the inventive concept disclosed in the application.

The present invention is primarily directed towards weighing scales for retail outlets such as supermarkets although is generally applicable to any weighing apparatus. As such the terms 'weighing apparatus' and 'weighing scale' are used interchangeably throughout this application. Typically weighing scales for supermarkets have a maximum load capacity of around 15 kilograms (known as a 15 kg scale) or less, although in principle load capacities above this may also be used. Typically a scale with a maximum load capacity of 15 kg has two partial weighing ranges each with a different specified accuracy, for example for up to 6 kg, the 15 kg scale has a resolution of 2 g which gives a range of 3000 divisions in that partial weighing range, and for 6 kg up to 15 kg the 15 kg scale has a resolution of 5 g giving a range of 1800 divisions in this second partial-range. Weighing scales may also be made to measure smaller weights more accurately, for example a 6 kg machine with a resolution of 1 g, giving a range of 6000 divisions.

The weighing apparatus of the present invention uses one or more load cells 10 as exemplified in FIGS. 1 and 2 to make the measurement of weight of an applied mass, with the readout typically calibrated in mass units of the applied mass. Typically the load cell 10 is fixed at one of its ends to a base portion, preferably a base plate 40, whilst the opposite free end is attached to a weighing platform or container. For purposes of convenient definition throughout this application the X and Y axes are defined with respect to the plan view of the load cell 10 as shown in FIG. 1 such that: the X axis is defined as the axis running parallel along the usual long dimension of the load cell 10 from the base plate mounting position to the free end of the load cell 10 where a weighing platform and associated fittings are attached; the Y-axis is defined as the axis perpendicular to this X axis, that nominally runs parallel to the short dimension of the load cell 10; each axis being in the horizontal plane.

The weighing apparatus of the present invention also comprises an inclinometer. An inclinometer for purposes of this application is any device operable to give one or more readings associated with the angle or slope of the inclinometer device with respect to the horizontal. In the preferred example, the inclinometer is an accelerometer 20 that outputs data values associated with inclination along two perpendicular axes in the plane of the horizontal. The output of an accelerometer 20 typically varies with temperature. These temperature variations may be compensated for by a variety of methods known in the art such as dedicated hardware, integrated with the accelerometer 20 that measures the ambient and/or accelerometer 20 temperature and automatically compensates for output variations according to a pre-defined relationship. Alternatively, the weighing apparatus may output data suitable to allow for temperature correction. Preferably an accelerometer 20 used in the weighing apparatus of the present invention is one which comprises temperature compensation functions, although in principle any type of accelerometer 20 can be used.

It is also preferred in the present invention that the accelerometer 20 outputs data values that correspond to inclinations that are accurate to better than ±0.05° in each measurement, more preferably ±0.01°. Typically an accelerometer 20 or other inclinometer is mounted on a PCB 30 (Printed Circuit Board) with associated electronics to operate the accelerometer 20. The accelerometer 20 is mounted in a pre-defined, substantially fixed positional relationship with respect to the load cell 10 so that the inclination values derived from the accelerometer 20 may be used to measure the inclination of the load cell 10. Preferably, the accelerometer 20 is mounted at the same inclination as the load cell 10 so that a measurement of zero tilt from the accelerometer 20 corresponds to the zero tilt of the load cell 10. The preferred positional relationship aligns one or both axes of acceleration measured by the inclinometer to one or both corresponding axes of the load cell 10 shown in FIG. 1. For certain calibration steps according to the preferred example of the present invention the accelerometer 20 is required to measure the acceleration along both the X and Y axes of the load cell 10.

In the preferred example of the present invention, the weighing scale is set up such that if the maximum inclination angle is above a certain threshold, for example 5° from the horizontal, the weighing scale will cease to output a weight value and instead instruct a user via a display to level the scale. Alternatively the weighing scale may automatically adjust the feet of the scale to bring the scale back to the true horizontal level. However below this threshold, the scale of the preferred example applies compensation to reduce the errors arising from the scale being tilted.

Accelerometers may also be mounted integrally with or on a load cell 10. However in the preferred example, the accelerometer 20 is mounted to the side of a load cell 10 together on a common base plate 40. This arrangement has advantages over load cells 10 integral with or mounted on a load cell 10 because (1) if either the accelerometer 20 or the load cell 10 are found faulty during assembly and calibration, only the faulty component needs to be replaced; (2) the base plate 40 can be made specifically to accommodate and provide mounting features for the PCB 30 whereas the load cell 10 is typically restricted in its facilities to mount an external PCB 30.

The base plate 40 in the preferred example is a precision machined single metal plate with two mounting regions on the top surface, one operative to mount the load cell 10 and one operative to mount a PCB 30 with an accelerometer 20. The base plate 40 may also be made of any suitable material that is rigid and provides sufficient resistance to temperature warpage. The base plate 40 may also be formed from one or more separate base plates that are subsequently fixed together.

In the preferred example, the combined sub-unit of the accelerometer 20, PCB 30, load cell 10 and base plate 40 is termed the "load cell assembly 15". However a load cell assembly 15 can be any arrangement where the load cell 10 and accelerometer 20 are in a fixed relative position. Once calibrated for inclination and mounting errors as described in the following sub section, the load cell assembly 15 may then be swapped as a single unit into a scale if an existing load cell assembly 15 in the scale is faulty rather than replacing the scale entirely. The bottom and top surfaces of the base plate 40 are preferably machined to within an in-plane inclination tolerance of +/−0.05° of each other so that when the base plate 40 is either sat or mounted on to another surface 50, the levels of the top surface regions for mounting the PCB 30 and load cell mounting top surfaces are known accurately with respect to each other.

Preferably the PCB 30 is mounted in close proximity to the region where the load cell 10 is mounted on to the base plate 40. In the preferred example, such a location is immediately adjacent and to the side of the load cell 10 as shown in FIG. 1. Mounting the accelerometer 20 as close as possible to the point at which the load cell 10 is mounted to the base plate 40 minimises the effects of any temperature or otherwise induced warpage occurring in the portion of the base plate 40 between the load cell 10 and the accelerometer 20. This proximal relationship is important as the positional and angular tilt relationships between the accelerometer 20 and load cell 10 must remain as fixed and as constant as possible on the base plate 40 throughout use to ensure that the calibration measurements are correct and continually applicable when the scale is used in normal operation.

To further minimise the effects of warping, the accelerometer 20 of the present invention is mounted in between two 'PCB 30-base plate 40' mounting fixtures 35 as shown in FIG. 1. The PCB 30 in the preferred example has two holes with edges located immediately adjacent (preferably less than 5 mm from) the edges of the accelerometer 20. Two screws pass through the two holes and into corresponding threaded holes in the base plate 40 to fix the PCB 30 (and hence accelerometer 20) to the base plate 40. Because of the proximity of the screws to the accelerometer 20 and by the fact that the PCB 30 is fixed to the base plate 40 via fixing either side of the accelerometer 20, the possibility of any PCB 30 warping that could significantly change the relative position of the accelerometer 20 with respect to the load cell 10 is minimised.

Inclinometer and Mounting Calibration

Different accelerometers usually have different operating characteristics. One of these characteristics is the constant inherent tilt offset present in the accelerometer 20 as a result of the accelerometer 20 manufacturing process. This inherent offset may be present even when the accelerometer 20 is completely level to the horizontal and thus may give a constant error in the calculation of tilt angles. The inherent offset value is usually different for each individual accelerometer 20 device whereby better (and usually more expensive) accelerometers typically have lower values of constant inherent tilt offset. Typically the more expensive accelerometers have inherent tilt offsets of +/−0.05 degrees or less.

When using an accelerometer 20 to measure the tilt of the load cell 10, other inclination errors may also be present. These errors arise from any relative tilt offsets between the accelerometer 20 and load cell 10 resulting from the mounting arrangements between the accelerometer 20 and the load cell 10. FIG. 3 shows an exaggerated case of such mounting errors for a load assembly according to the preferred example. These errors in a preferred example can result from:
a) the mounting of the accelerometer 20 to the PCB 30,
b) the mounting of the PCB 30 to the base plate 40
c) any machining errors in the base plate 40 giving rise to inclinations between the bottom surface of the base plate 40 and the regions of the top surface of the base plate 40 for mounting the load cell 10 and the accelerometer 20/PCB 30
d) the mounting of the load cell 10 to the base plate 40.

The present inventors have realised that when using an accelerometer 20 to obtain an accurate reading of the tilt of the load cell 10 in the weighing scale, the accelerometer 20 does not need to have a low value of inherent tilt offset. Instead, the inventors have found that by mounting the accelerometer 20 and load cell 10 into a fixed unit or assembly and then calibrating this unit to compensate for internal accelerometer 20 tilt offsets and mounting inclination offsets, a cheaper accelerometer 20 may be used with an inherent tilt offset larger than the more accurate tilt offsets of the more expensive accelerometers. In the preferred example of the present invention the accelerometer 20 used has an inherent tilt offset of up to +/−0.11 degrees. Furthermore the inventors of the present invention have found that calibrating the load cell assembly 15 factors out the mounting errors so that the accelerometer 20 does not necessarily need to be mounted directly onto or within the load cell 10.

The above mounting errors and inherent accelerometer 20 offsets are calibrated for by a first calibration step that calibrates for all initial inclination offsets between the load cell 10 and accelerometer 20. The first calibration step according to the preferred example is a single calibration measurement made when the load cell assembly 15 is flat to the horizontal to within ±0.05°. This first calibration step is preferably performed on the load cell assembly 15 before the assembly is mounted into the weighing scale and before the weighing platform is mounted on the load cell 10. In the preferred example this calibration procedure is run automatically using computer software, although in principle it may be run manually or in any other automatic or non-automatic manner. The base plate 40 together with the rest of the load cell assembly 15 is placed on a flat surface 50 level to the horizontal to within +/−0.05 degrees. The output values from the accelerometer 20 (corresponding to the tilt offset and mounting errors described above) are then read and stored in a memory storage device in the load cell 10 or other storage medium. Preferably the storage medium should be on the load cell assembly 15 in order to allow replacement of load cell assemblies 15 in a scale without recalibration of inclination and mounting offsets or the need to consult externally stored data or records. The tilt at which the load cell assembly 15 is measured during this calibration step is taken to be the true 'zero tilt' or precisely horizontal orientation of the load cell 10 for any calibration steps and other measurements of applied load so that the corresponding X and Y accelerometer 20 offset values can be used for any further calibration steps or measurements of applied load.

The load cell output in the preferred example is converted from an analogue signal to a digital signal using an analogue to digital converter (A-D converter) and is then filtered by a digital filter, preferably implemented in hardware, to give a weight reading every 100 ms. This frequency of weight reading gives a good compromise between processor performance requirement and giving a good visual response on an output display of a weighing scale. The filtered data that are output from the load cell 10 are not direct weight measurements, but numbers of load cell 'counts' that correspond to particular loads directed along the load cell's measurement axis. These filtered load cell output count values can then be converted into a weight value and thus a mass value that can be output by the scale. For purposes of convenient terminology in this application it is assumed that the load cell outputs are 'count' values that are processed so as to be converted into weight and/or mass values for output by the scale.

The raw data output from the accelerometer 20 corresponding to the X and Y axis tilts in the preferred example are also filtered by the same filtering process as the weight filtering and thus the filtered accelerometer readings (correspondingly denoted as Dx and Dy) are output at the same rate as the filtered weight readings. The raw output data from the accelerometer 20 corresponding to the X and Y tilt axes when the load cell 10 is at the true zero horizontal level are denoted as Dxi and Dyi respectively. From these two accelerometer output data values Dxi and Dyi, the acceleration values corresponding to the X and Y axes for a scale at zero tilt can be determined and stored as values Xoff and Yoff respectively. The values Xoff and Yoff are preferably electronically stored in a memory device in the load cell assembly 15, more preferably in the load cell 10. The zero tilt offset values Xoff and Yoff then can be used to determine the relative tilt of the load cell 10 in subsequent measurement or calibration steps as detailed later in this application.

The accelerometers typically used in the preferred example have a digital offset constant (Dk) and a sensitivity constant (Sk) inherent to the operation of the accelerometer 20 device. These constants Dk and Sk are used in equations 1 and 2 below in the preferred example to give the acceleration readings Xoff and Yoff for the respective X and Y axes.

$$Xoff = \frac{(Dxi - Dk)}{Sk} \qquad \text{Equation 1}$$

$$Yoff = \frac{(Dyi - Dk)}{Sk} \qquad \text{Equation 2}$$

The first inclination offset calibration step of the present invention can equally be performed on a load cell assembly 15 mounted in the weighing scale. The advantage of the preferred example in calibrating only the load cell assembly 15 prior to being mounted in the scale is that when the load cell assembly 15 is mounted on to other scale components such as a scale case, which is supported by scale feet, it then becomes extremely difficult to make sure that the load cell 10 is on a flat surface 50 level to within +/−0.05 degrees of the horizontal. This is because the other components such as the feet of the scale and the bottom of the scale case are typically not accurately manufactured to be level to the horizontal and may have further unwanted inclinations with respect to each other because of how they are fixed together. In contrast, by having the load cell 10 on a single precision machined base plate 40 where the top surface mounting regions are known to be flat and parallel to the bottom surface of the base plate 40 to within +/−0.05 degrees, then the load cell 10 is known to be on a flat horizontal to within +/−0.1 degrees when the base plate 40 is located on a level platform which is accurate to +/−0.05 degrees to the horizontal.

The preferred example describes one method of determining the values Xoff and Yoff. However, other methods may be used to determine the initial X and Y accelerometer values Xoff and Yoff that are representative of the values the accelerometer outputs when the load cell 10 is taken to be flat to the horizontal. The advantage with the preferred method is that once a calibration rig is set-up with a testing surface 50 flat to +/−0.05 degrees off the horizontal, only one measurement is required to calibrate for initial inclination errors, thus cutting down manufacturing time and saving cost.

Once the load cell 10 has been calibrated for inclination offsets as described above, the load cell assembly 15 may then be mounted into a weighing scale casing and a weighing platform or container and associated fixings may be attached to the free end of the load cell 10. The load cell 10 may, with this initial inclination offset calibration accomplished, make measurements of applied loads that compensate for the errors arising from the tilting of the applied load when the weighing scale is tilted off axis from the horizontal.

Similar to equations 1 and 2, when the load cell 10 (and hence accelerometer 20) is used subsequent to the initial inclination calibration, the acceleration output values Xa and Ya corresponding to the tilt along the X and Y axes respectively may be derived from the raw X and Y data output from the accelerometer 20 Dx and Dy using equations 3 and 4 below.

$$Xa = \frac{(Dx - Dk)}{Sk} \qquad \text{Equation 3}$$

$$Ya = \frac{(Dy - Dk)}{Sk} \qquad \text{Equation 4}$$

The angles of tilt Xb and Yb along the X and Y axes respectively may be derived from the acceleration values Xa and Ya and the initial X and Y offset accelerations Xoff and Yoff by using equations 5 and 6.

$$Xb = \arcsin(Xa - Xoff) \qquad \text{Equation 5}$$

$$Xc = Xb - Tc \qquad \text{Equation 5a}$$

$$Yb = \arcsin(Ya - Yoff) \qquad \text{Equation 6}$$

$$Yc = Yb - Tc \qquad \text{Equation 6a}$$

In the preferred example the accelerometer 20 is also compensated for temperature whereby the error in angle at a particular temperature is termed Tc. Temperature compensated tilt angles Xc and Yc along the X and Y axes respectively may therefore be calculated by subtracting the temperature dependent error in angle Tc from the original tilt angles Xb and Yb as described in equations 5a and 6a.

The measurement errors present when an applied load is measured by a tilted scale may be corrected by a single combined tilt Td that takes into account both of the temperature compensated tilt angles Xc and Yc as described by equation 7 below. The combined tilt Td can then be used with equation 8 to compute a tilt compensation factor Tk that can be applied to correct the measurement errors in load cell readings as described within this application.

$$Td = \sqrt{(Xc^2 + Yc^2)} \qquad \text{Equation 7}$$

$$Tk = \cosine(Td) \qquad \text{Equation 8}$$

Calibrating for Tilt Dependent Deadweight and Other Load Cell Signal Offsets

Independently of the initial calibration to compensate for: (i) the errors in weight resulting from an applied load being at an angle when the load cell 10 is tilted off the horizontal; and preferably,
(ii) the temperature dependence of the accelerometer 20; the deadweight arising from the dead load of the scale must also be properly calibrated for tilt dependent error.

The present inventors have found that the output reading or 'counts' value output from the load cell 10 when no load is applied is a combination of two main sources:
1) The deadweight of the dead-load.
2) Other sources such as such as substantially constant offsets from electronics built into or associated with the load cell 10, for example an A-D converter. These other sources are typically constant but may in principle result from any source that contributes to the output count reading from the load cell 10 and/or the devices affecting the number of counts output by the load cell 10 that has a different relationship with load cell assembly 15 tilt than that of the deadweight of the deadload. In the preferred example, the 'other sources' result from the A-D converter and are hereinafter referred to as 'electronic offsets'.

Similar to the cosine tilt dependence of the measured weight of applied loads, the measured deadweight of the dead-load of the scale also varies with the cosine of the combined tilt angle. However the electronic offset is substantially a constant that typically does not vary with tilt. Thus part of the total load cell output value is associated with weight and varies with the inclination of the load cell 10 according to a first inclination relationship whereas one or more other parts of the total load cell output value (further values) vary with the inclination of the load cell 10 according to a second or further inclination relationship that are different to the first inclination relationship. In the preferred example, if a scale is tilted with no applied load, the total output reading from the load cell 10 will vary with tilt by being the sum of a tilt variable dead weight and a constant electronic offset.

Therefore taking the output count reading derived from the load cell 10 when no load is applied as an absolute measurement of deadweight is incorrect because this reading also includes the 'electronic offsets' which do not equate to the dead-load. This 'electronic offset' addition to the deadweight that is measured by the load cell 10 becomes a problem when wanting to pre-calibrate the scale for deadweight as detailed below.

When a scale is used to measure the weight of an applied load, the output reading from the load cell 10 is a combination of:
 the weight of the applied load (variable with load cell tilt),
 the weight of the dead-load of the scale (variable with load cell tilt), and,
 the constant electronic offsets that are present Previous methods of weighing scale tilt compensation simply apply tilt correction to the total load cell output reading when the applied load is placed on the scale to obtain a value of tilt corrected weight of an applied load. To then obtain a tilt corrected weight value for just the applied load, the scale or other weight calculating system subtracts the relevant count values corresponding to the deadweight of the dead load measured at zero tilt and the electronic offset. However, the present inventors have found that by initially tilt correcting the total output count from the load cell 10 when a load is applied, the dead-load and applied load weight components are compensated for but the electronic offsets are needlessly being tilt compensated to a larger new value giving rise to an error in the tilt compensated output reading. Thus subsequently subtracting a single previously stored value of deadweight and electronic offset from this tilt corrected total count will under compensate for the electronic offsets giving a false value of the weight of the applied load.

An example is now given to illustrate the source of the above mentioned error. The values given are not real but are just intended to show the source of the error that the present invention has identified and mitigates. This example assumes no other errors are present arising from sources such as temperature variation and load cell bending moments.

The example relates to measuring a 6 kg load that is placed on a weighing scale that is tilted to 5 degrees. Assume the number of load cell counts that corresponds to a true value of the applied load if measured at zero tilt is 600000; the number of load cell counts that corresponds to the (measured) deadweight of the dead-load at zero tilt is 150000 counts, the electronic offset is 5000 counts. Before the measurement of the applied load is made, the scale has pre-stored a number of load cell counts corresponding to no applied load at zero tilt which is the sum of the electronic offsets and the deadweight which is 5000+150000=155000 counts. The applied load is then placed upon the scale when at a tilt angle of 5 degrees. The load cell outputs a value of 735000 counts of which: 590000 of the counts are a result of the applied load which is less than the true 600000 value since the scale is tilted; 140000 of the counts are a result of the dead-load which is less than the true 150000 value since the scale is tilted; 5000 of those counts are attributable to the electronic offset which is constant and has not been changed by the tilt of the scale. According to prior art methods, the total count of 735000 is then globally (as a whole) corrected for tilt to a value of 755200 of which: the initial value of the applied load has been correctly adjusted to 600000; the initial value of the dead load has been correctly adjusted to 150000; but the initial value of electronic offset has been incorrectly adjusted to 5200. When the scale then subtracts the pre-stored 'zero-tilt' count value 155000 (corresponding to dead-load and electronic offset) from the tilt corrected value of 755200, the error from the overcompensated electronic offset remains. The resulting count value for the applied load equates to 600200 which in turn corresponds to an incorrect weight output of the applied load of 6002 kg.

The present inventors have identified that to be able to obtain more accurate measured weight values of an applied load when a weighing scale is tilted at an angle, the output reading from the unloaded scale must be compensated for in the output reading from the loaded scale by taking into account, and modifying if necessary, the portions of the loaded and unloaded readings that are variable with tilt according to a first relationship and those that are not variable with tilt (substantially constant) or variable with tilt according to a second relationship. When calculating a modified value of the load cell output counts by applying tilt compensation according to the preferred example, the correct value of electronic offset is subtracted from the tilt compensated count value of the load cell 10 when measuring the applied load. This may be accomplished by a variety of methods, including: storing numerous tilt compensated values of electronic offset and recalling and subtracting the appropriate electronic offset according to the tilt measured by an inclinometer; making a zero load calibration measurement every time a load is going to be measured and at the same tilt angle as the measurement of the applied load, preferably making the zero load calibration measurement immediately before or after the applied load measurement. The method according to the preferred example of this application comprises predetermining the electronic offset for the scale, storing this value and subsequently using and reusing it when making any further load cell measurements.

Pre-calibrating in order to remove the correct values of deadweight and constant offset is desirable for scales in retail or other environments, so that a normal user of the scale doesn't have to make two comparative measurements every time at the same scale tilt angle to measure the actual weight of an applied load.

The present invention thus pre calibrates the weighing apparatus by measuring with the load cell 10 in a first position a first load cell output value corresponding to at least a first weight value and a first further value. The first weight value varies with the inclination of the load cell 10 according to a first inclination relationship. The present invention then measures, with the inclinometer, the inclination value associated with the tilt of the load cell 10 at the first position. Once these measurements have been made, the method of the present invention then measures with the load cell 10 in a second position a second load cell output value corresponding to at least a second weight value and a second further value. The second position at a different inclination than the first position however the second weight value still varies with the inclination of the load cell 10 according to the first inclination relationship. Again, the inclinometer measures a second inclination value associated with the tilt of the load cell 10 at the second position. Once all these measurements have been made, the present invention then compares the first value and second value and derives a parameter (for example an 'electronic offset') based upon a second inclination relationship between the further values and load cell inclination. The second inclination relationship is different to the first inclination relationship and may be substantially constant.

In the preferred example this method is applied by determining the 'electronic offset', by reading at least two load cell measurements at different tilt angles, denoted below as output count values M1 and M2. The at least two measurements are taken with the same amount of applied load, which in the preferred example is zero. Preferably these two values of inclination should be far enough apart to get an accurate representation of the cosine relationship of the deadweight. Because at the two different tilt angles, the deadweight will change in a known cosine relationship, but the electronic offset remains constant, comparison of M1 and M2 will allow the determination of the number of counts associated with the electronic offset. Once known, the electronic offset in the preferred example can then be removed from a measurement prior to any tilt compensation being applied.

In the preferred example, the first measurement (M1) of deadweight and electronic offset is taken with no applied load when the load cell 10 is at zero tilt to the horizontal. In the preferred example, this value is known as 'zerovalue' and is stored (preferably in the load cell 10) for use in other calibration steps described later in this application. The second measurement (M2) is preferably taken when the load cell 10 is inclined solely along one axis (X or Y) to the maximum expected tilt that the weighing scale will be designed to correct for in normal operation, which in the preferred example is 5°. When inclined to the second inclination angle along the one axis, the other perpendicular axis is kept substantially level to within +/−0.1 degrees of the horizontal. In principle however measurements M1 and M2 can be taken with any two different combinations of X and Y tilt. With the deadweight and electronic offset measured at 0 and 5 degree inclinations to the horizontal, the count component (DW) corresponding to dead load can be calculated using equation 9.

$$DW = \frac{(M1 - M2)}{(1 - \cos(Td))} \qquad \text{Equation 9}$$

Because in the preferred example, measurement M1 was taken with both axes level to the horizontal to within ±0.1°, M1 can be taken as the value of constant offset and maximum value of deadweight, thus the constant value electronic offset in the count values, Eoff, can then be calculated using equation 10. This value may be stored in a memory device in the load cell 10, load cell assembly 15 or other part of the weighing apparatus, or may be stored permanently or temporarily in an external system performing the calibration measurements.

$$Eoff = M1 - DW \qquad \text{Equation 10}$$

The above tilt dependent deadweight calibration measurement in the preferred example is conducted once the load cell assembly 15 has been assembled into the weighing scale with the weighing platform fixed to the free end of the load cell 10. By referring to the accelerometer 20 output values, hence tilt angles, derived from the accelerometer 20, the weighing scale is firstly levelled to within +/−0.1° to the horizontal. This is typically done by adjusting the feet of the scale. No applied load is placed upon the weighing platform. Measurement M1 is then recorded at the first inclination angle of 0 degrees to the horizontal. The weighing scale is then tilted to be at the second inclination angle (5 degrees to the horizontal in the example) and the measurement M2 stored.

Once the constant electronic offset 'Eoff' is calculated and stored in the weighing scale it can then be used in more accurately measuring the weight of an applied load on a tilted scale. The load cell output count reading from placing the applied load on the scale is Wa, which corresponds to the applied load, the dead-load and the electronic offset. Once this measurement Wa has been made and with Eoff already known and stored, the scale can then correctly calculate the true zero tilt weight of the applied load. This is done firstly by subtracting the pre-calculated stored value of Eoff from the total load cell output counts (Wa) to leave only the load cell output counts corresponding to the dead-load and applied load, both of which have a cosine dependent relationship with tilt. Then secondly applying tilt compensation to give a value (Wb) representing the correct 'zero-tilt' count value of deadload and applied load.

$$Wb = \frac{(Wa - Eoff)}{Tk} \qquad \text{Equation 11}$$

Obtaining an accurate tilt corrected weight value of the applied load can then be calculated according to equation 12 by subtracting off the previously calculated zero-level deadweight from Wb. Alternatively, the combined tilt compensated deadload and applied load value (Wb) can be used as a term in a weight calculation that further compensates for other weighing errors as described below.

Counts corresponding to applied load weight=$Wb-DW$        Equation 12

Calibration for Residual Load Cell Error

The present inventors have also found that when a scale is tilted, errors in the measured weight value of an applied load still occur even when compensating for:

the errors in weight resulting from an applied mass being at an angle to the load cell measurement axis when the load cell 10 is tilted off the horizontal;

the temperature dependence of the accelerometer 20; and offsets that remain constant when compensating for the tilt dependence of the deadweight of the dead-load.

For purposes of nomenclature in this application, these extra errors in the measured weight are termed 'residual errors' and have been found to be due to the effects that tilt has on the internal workings and components of the load cell 10. When a load to be weighed is applied to the scale, the act of applying weight causes distortion to the load cell 10. When this is performed at an angle, further bending moments in the load cell 10 cause an error in the output weight reading that is not compensated for using the tilt correction methods described above in the previous section. The present inventors have discovered that errors are also caused by any slight misalignment of the strain gauges that are bonded to the load cell frame. As such, if a weighing scale is to compensate for these errors, a more complex calculation of load/weight on a tilted scale is needed than as stated in equation 12.

The present inventors have found through experiment that these residual weighing errors increase with increasing tilt and increasing load wherein the residual error about the Y axis is proportional to the product of applied load and tilt whilst the residual error about the X axis is proportional to the product of the tilt and the square of the applied load as described by the equations 13 and 14 below.

$Y$ residual error $\propto$ (applied load)×(tilt)        Equation 13

$X$ residual error $\propto$ (applied load)$^2$×(tilt)        Equation 14

The present invention therefore provides a method of pre-calibrating a weighing apparatus to compensate for these residual errors. This is achieved my making one or more load cell measurements of one or more masses at a tilt, compensating for the tilt according to a known inclination relationship, noting (recording) the residual error existing after the initial inclination compensation and calculating one or more error compensation parameters that can be used in subsequent measurements using the load cell 10. A first value associated with a weight of a first mass is provided to or by the apparatus. The first value is associated with the weight of the first mass when measured at a first inclination value. In principle, the first inclination value may be a value that is level with the horizontal or at an inclination to the horizontal. Preferably, the first weight value is associated with the weight of the first mass wherein the first inclination value is zero i.e. level with the horizontal. This first value may be previously known or may be derived by the apparatus by making a first measurement. When the first value is derived by the apparatus, a first measurement is preferably made with the load cell 10 at a substantially horizontal level. The first measurement outputs a first value associated with the weight of a first mass, which may be an applied load on the scale or the dead-load of the scale itself.

The present invention then requires the first mass to be measured when the load cell 10 is at a second inclination from the horizontal so that a second value associated with a weight of the first mass is recorded. The second inclination from the horizontal that corresponds to the second value is different to the first inclination associated with the first value. Whilst at this second inclination, the inclinometer measures a second inclination value. The present invention then modifies the second weight value in accordance with at least a known inclination relationship and the second inclination value to a modified value that corresponds to the first inclination level. For example, if the first value is associated with the weight of the first mass measured level to the horizontal, then the second weight value is modified using the known inclination relationship to return a modified second weight value that also corresponds to the horizontal level. This known inclination relationship is typically a cosine relationship. The calibration method then compares the first weight value and the modified second weight value and calculates an error parameter based at least upon the results of the comparison; and an error relationship (such as described in equation 13 and 14) between weight, and load cell inclination. Other values that may be used to calculate the error parameter include the first weight value and the inclination value. When calibrating for residual load cell errors according to equation 14, another mass different to the first mass is measured at the horizontal and at a tilt and used to calculate the error parameters.

In the preferred example, the method compensates for the residual errors by:
a) calculating a correction factor (Yk) for the residual errors in the Y axis, and;
b) calculating two correction factors (Xk1, Xk2) for the residual errors in the X axis;
c) storing these correction factor values and,
d) using them in subsequent measurements of applied load.

In the preferred example, two error values are calculated and summed to take into account the quadratic nature of the load cell bending moment errors resulting from any X axis tilt. One error value is calculated to take into account the linear nature of the load cell bending moment errors resulting from any Y axis tilt.

The preferred example uses these correction factors to calculate residual error values in each axis. The error values are then subtracted from the count value Wb described in equation 11 to obtain a count value corresponding to the weight of the dead-load and applied load that is correctly compensated for tilt, having removed any constant offsets that should not be tilt corrected; and compensated for residual errors.

The preferred example achieves this by calculating a residual error compensated weight count We from the count value Wb as detailed in equation 15 wherein each correction factor is multiplied by the tilt calculated in the respective axis (Xc or Yc) and the tilt corrected count value of dead-load plus applied load, Wb. The Xk2 term is multiplied by the square of Wb.

$$Wc = Wb - [(Wb^2 \times Xc \times Xk2) + (Wb \times Xc \times Xk1) + (Wb \times Yc \times Yk)] \quad \text{Equation 15}$$

It may however be envisaged that residual correction factors need only be calculated for one axis (X or Y), for example where it is anticipated that the scale will only ever be tilted in that particular axis. Furthermore, other mathematical methods may be employed to calculate and thus compensate for the residual errors resulting from load cell bending moments.

The preferred example obtains the correction factors by making: one or more calibration measurements to calculate the correction factor in the Y axis: and at least two calibration measurements to calculate the correction factors in the X axis. The two measurements required to calculate the X correction factors Xk1 and Xk2 are due to having to solve quadratic equations because of the quadratic relationship between load and residual error. These calibration measurements for determining the X and/or Y residual error correction factors are termed 'secondary calibration measurements' for purposes of this application. The secondary calibration measurements for the Y axis form one set, the secondary calibration measurements for the X axis form another set. Each set of secondary calibration measurements involve placing one or more known loads on the scale when the scale is tilted about the Y axis and two or more known loads on the scale when the scale is tilted about the X axis. A known load is an applied load that has a previously and accurately measured known weight.

In order to calculate the correction factors Yk, Xk1 and Xk2 a reference value of load cell counts is required for each of the known loads. The reference count values of the known loads may be derived in a number of ways. One method would be to record the number of counts for each known load to be used in the secondary calibration measurement when the scale was flat to the horizontal and then subtract the load cell count value for the scale at the horizontal when no load was applied to the scale. This however would require a number of measurements, one for each known load used in the secondary calibration measurements.

The preferred example utilises the linear relationship between the number of counts output from the load cell 10 with respect to increasing applied load. Thus by knowing the load cell counts corresponding to two 'zero-tilt' measurements of applied load, the linear relationship between counts and applied load can be determined. Once the linear relationship is determined, the number of counts of any arbitrary applied load can be calculated using this relationship. This linear relationship is typical for load cells 10 for weighing apparatus of the present invention, however if other nonlinear load-count relationships are found to exist for the load cell 10, then such relationships should be appropriately determined by the methods described herein and those according to the state of the art.

The preferred example determines this linear relationship by calculating a 'span value' according to equation 16. The span value is the difference between the counts measured by the load cell 10 at zero tilt with no applied load (known as zerovalue as mentioned previously) and the counts measured by the load cell 10 at zero tilt with the applied load corresponding to the maximum load that the load cell 10 is to nominally measure in practice. Because the measurements to calculate the span value are taken when the scale is flat to the horizontal to within +/−0.1 degrees, the span value thus gives the correct number of counts that corresponds to the maximum known applied load in the secondary calibrations measurements, as errors are not present from the effects of tilting. The span value is then stored for the maximum known load to be placed on the scale in the secondary calibrations. The correct (zero tilt) number of counts for any other smaller known load applied to the scale can then be calculated simply by dividing the span value to the appropriate fraction corresponding to what fraction the smaller known load is compared to the maximum known load. For example, if the maximum known load applied is 6 kg and the smaller known load is 2 kg then the correct 'span' count value for the smaller load is simply the span value for the maximum load divided by 3.

$$\text{spanvalue} = (\text{counts at maximum known load, 0 tilt}) - (\text{counts at zero load, 0 tilt}) \quad \text{Equation 16}$$

In the preferred example, one secondary calibration measurement is used to determine Yk. The scale is tilted to 5 degrees in the Y axis and kept level in the X axis to ±0.1°. The full (maximum) known load is applied onto the scale, for example 6 kg (for a 6 kg scale). The actual value of angular tilt Yc in the Y axis measured by the accelerometer 20 is recorded along with the load cell count value for that measurement. A value of tilt compensated weight of the applied load plus deadload (Wb) is calculated according to equation 11. The value of Yk is then determined using Equation 17.

$$Yk = \frac{(Wb - zerovalue - spanvalue)}{[(Wb - Eoff) \times Yc]} \quad \text{Equation 17}$$

Another similar secondary calibration measurement set is performed to determine Xk1 and Xk2. The present inventors have experimentally found that the smaller of the two loads in the secondary calibration measurements required to determine Xk1 and Xk2 should be approximately ⅓ of the maximum applied load. At this value it has been found that the residual errors resulting from tilt start to become significant.

The scale is tilted to 5 degrees in the X axis and kept level in the Y axis to ±0.1°. The full (maximum) known load is applied onto the scale, for example 6 kg (for a 6 kg scale). The actual value of angular tilt Xc in the X axis measured by the accelerometer 20 is recorded along with the load count value for that measurement. A value of tilt compensated weight of the applied load plus dead-load (Wb) is calculated according to equation 11. The same secondary calibration step is repeated for a ⅓ known load (2 kg) when the scale is tilted in the X-axis to 5 degrees. The correction factors Xk1 and Xk2 are then calculated using equations 18-25. The terms E1, FB1 and FA1 are simply values representing the results of intermediate calculation steps of Xk1 and Xk2 where Wb corresponds to the calibration step when the full (maximum) known load is applied onto the scale. The terms $E_{1/3}$, FB2 and FA2 are simply values representing the results of intermediate calculation steps of Xk1 and Xk2 where Wb corresponds to the secondary calibration measurement when the smaller known load is applied onto the scale (which in the preferred example is ⅓ of the full known load).

$$E1 = (W_b - zerovalue) - spanvalue \quad \text{Equation 18}$$

$$FB1 = \frac{(W_b - Eoff)}{Xc} \quad \text{Equation 19}$$

$$FA1 = FB1(Wb - Eoff) \quad \text{Equation 20}$$

$$E_{1/3} = (W_b - zerovalue) - (spanvalue/3) \quad \text{Equation 21}$$

$$FB2 = \frac{(W_b - Eoff)}{Xc} \quad \text{Equation 22}$$

$$FA2 = FB2(Wb - Eoff) \quad \text{Equation 23}$$

$$Xk1 = \frac{\left[\left(E1 \times \frac{FA2}{FA1}\right) - E_{1/3}\right]}{\left[\left(FB1 \times \frac{FA2}{FA1}\right) - FB2\right]} \quad \text{Equation 24}$$

$$Xk2 = \frac{[E1 - (FB1 \times Xk1)]}{FA1} \quad \text{Equation 25}$$

The present inventors have found that a degree of crosstalk exists between the residual load cell errors in the X and Y axes. When the scale is tilted about one axis but kept approximately level in the other, as described for the secondary measurements, some or all of the factors that give rise to the residual errors in the tilted axis may also produce residual errors in the orthogonal axis. This crosstalk may arise, for example, from crosstalk within the accelerometer 20 and/or crosstalk within the load cell 10. Additionally, because the level axis is only level to within ±0.1° of the horizontal, there may still be up to ±0.1° of tilt in the orthogonal axis contributing to the overall residual error in a secondary calibration measurement.

It has therefore been found that the correction factor/s to compensate for the residual errors in one axis can be determined more accurately when calculated using the compensation factors previously derived for the residual errors in the orthogonal axis. It has also been found that the compensation factors in one or more axes may also be required to be re-calculated one, or a successive number of times to iteratively improve the accuracy of the compensation factor/s due to the effects of the crosstalk.

The preferred example takes into account and corrects for the residual error cross talk by using the term Wc (as defined in equation 15) to replace the term Wb in equations 17-23. For the initial secondary calibration measurement where none of the correction factors Yk, Xk1 or Xk2 are known, all three correction factors (Xk1, Xk2, Yk) are set to zero. After the initial secondary calibration measurement set for one axis is completed, the correction factor/s for that particular axis are then calculated as described above and stored. In the next secondary calibration measurement set for the orthogonal axis to the initial set, the correction factors are determined by using the value of Wc calculated with the previously determined correction factors for the orthogonal axis, instead of Wb.

The secondary calibration measurements may be repeated alternately, where each time, the new values of the correction factors for that axis are calculated using an improved, more accurate value of the correction factors for the orthogonal axis. The present inventors have found however that sufficient accuracy of the compensation factors can be obtained by performing an initial set of secondary calibration measurements thus deriving correction factors for a first axis, using those initial factors in deriving the correction factors for the orthogonal second axis and then repeating the secondary calibration set for the first axis again using the correction factors calculated for the second axis.

Once all secondary calibration measurements have been completed, the calculated values of Xk1, Xk2 and Yk are then stored a memory device preferably in the load cell 10 or load cell assembly 15. Thus, in the preferred example, the load cell 10 of the weighing scale has the following values stored from all the previous calibration steps as described in table 1.

TABLE 1

Calibration values stored in the preferred example.

| Term | Explanation of the term |
|---|---|
| Xoff | Value of acceleration from the accelerometer 20 along the X axis when the load cell 10 is flat to the horizontal to within +/−0.1 degrees in each axis. |
| Yoff | Value of acceleration from the accelerometer 20 along the Y axis when the load cell 10 is flat to the horizontal to within +/−0.1 degrees in each axis. |
| zerovalue | Filtered load cell count value for the scale flat to within +/−0.1 degrees in each axis, no applied load |
| Eoff | Filtered load cell count value for any load cell constant offset not due from the dead-load or an applied load. |
| spanvalue | Filtered load cell count value for the scale flat to within +/−0.1 degrees in each axis, no applied load |
| Xk1 | Correction factor used to compensate for the residual tilt dependent load cell errors for the component of scale tilt in the X axis. |
| Xk2 | Correction factor used to compensate for the residual tilt dependent load cell errors for the component of scale tilt in the X axis. |
| Yk | Correction factor used to compensate for the residual tilt dependent load cell errors for the component of scale tilt in the Y axis. |

In principle, other values calculated or measured from the previous calibration steps may also be stored in the load cell 10 or load cell assembly 15.

Order of Steps to Compensate for Tilt when the Weighing Apparatus is in Normal Use Once the load cell assembly 15 and the scale have been calibrated using the previous calibration methods the calibrated weighing apparatus is able to take a load cell reading when an unknown applied load is placed on the scale and compensate for: the errors in weight resulting from an applied load being at an angle when the load cell 10 is tilted off the horizontal; any temperature dependence of the accelerometer 20; constant offsets when compensating for the tilt dependence of the deadweight of the dead-load; residual tilt dependent load cell errors resulting from effects such as additional load cell bending moments or strain gauge misalignment.

The present invention compensates for the residual errors by using the calculated error parameters (which in the preferred example are Xk1, Xk2 and Yk) to obtain accurate tilt compensated weight and/or mass values. This is achieved by measuring a first value with the load cell 10 corresponding to at least a weight value wherein the weight value varies with the inclination of the load cell 10 according to a first inclination relationship (such as the normal cosine relationship that measured weight has with scale tilt). Whilst the load cell 10 is in the same position, the inclinometer measures an inclination value associated with the inclination of the load cell 10 this is preferably done simultaneously with the measuring of the first load cell value. Using the measured inclination value, the measured weight value is then modified in accordance with the first inclination relationship to compensate for the tilt dependence of measured weight and also further modified using the error parameter to compensate for the residual errors.

The weighing apparatus according to the preferred example compensates for these errors once a measurement Wa is taken by the load cell 10 for an unknown load by:

a) recording the accelerometer 20 values from the accelerometer 20 and computing the acceleration values Xa and Ya in each load cell axis according to equations 3 and 4;

b) calculating the tilt angles Xb and Yb in each load cell axis according to equations 5 and 6;

c) applying temperature compensation to the tilt angles Xb and Yb to give Xc and Yc according to equations 5a and 6a;

d) removing any constant electronic offsets 'Eoff' from the initial load cell output count Wa and then compensating for tilt using equation 11 to give the tilt compensated count value (Wb) of the weight of the unknown load plus the dead-load;

e) compensating the tilt compensated weight count of the dead-load plus applied load (Wb) for the tilt dependent residual errors in the load cell 10 using equation 15 to give Wc;

f) optionally applying gravity compensation to Wc to give the gravity compensated weight value of load plus dead-load Wd;

g) removing the deadweight of the dead-load from Wd to give the weight of the unknown applied load using equation 26.

$$We = Wd - (zerovalue - Eoff) \qquad \text{Equation 26}$$

As stated above, the method of the present invention may also apply gravity compensation to take into account the location dependent nature of gravity. Gravity compensation factors 'Gf' for the calibration site and 'Gs' for the site of use are stored, preferably in the load cell assembly 15, and applied to the value Wc according to the equation 27 to calculate the gravity compensated value Wd of load and dead-load. Equally, gravity compensation may be applied to the weight value of the unknown applied load after removal of the deadweight of the dead-load.

$$Wd = \frac{(Wc \times Gf)}{Gs} \qquad \text{Equation 27}$$

Order of Making the Calibration Measurements in the Preferred Example

The preferred example of the present invention performs the above mentioned calibration measurements in the following order.

1. The values of Xoff and Yoff are derived as described above by placing the load cell assembly 15 on a flat surface 50 and recording the accelerometer values. The load cell assembly 15 is then assembled such that at least the weighing platform and fittings are attached to the load cell 10. Preferably the load cell assembly 15 is mounted into a complete weighing scale housing.
2. The load cell assembly 15 or scale is adjusted so that the load cell 10 is flat to the horizontal, taking into account of the inclination offset values Xoff and Yoff.
3. While at zero tilt, the 'zerovalue' as described above is measured by recording the load cell counts when no load is applied to the weighing platform. zerovalue is also the value of M1 in equation 9.
4. While still at zero tilt, the span value is measured by recording the load cell counts when a known maximum applied load is placed on the platform.
5. The applied load is then removed and the scale tilted to nominally the maximum tilt value experienced in normal weighing operation, which in the preferred example is 5 degrees ±0.5° in the Y axis. The accelerometer values are recorded and used to calculate the current tilt angles Xc and Yc. The load cell count M2 is also recorded. The electronic offset 'Eoff' can then be calculated using equations 9 and 10.
6. Whilst at the 5 degree tilt angle in Y, the maximum applied load is placed on the weighing platform and the load cell counts are recorded. This measurement corresponds to the secondary calibration measurement for the Y axis. The correction factor of Yk is calculated.
7. The scale is then levelled to ±0.1° in the Y axis and tilted to nominally the maximum tilt value experienced in normal weighing operation, which in the preferred example is 5 degrees ±0.5° in the X axis. The maximum applied load is placed on the weighing platform and the load cell counts are recorded. The maximum load is then replaced with a smaller load that is an accurately know fraction (nominally a third) of the weight of the maximum load, although as described above this smaller load maybe any load with mass less than the maximum load. The load cell counts are recorded. These measurements correspond to the secondary calibration measurements (measurement set) for the X axis. The correction factor of Xk1 and Xk2 are calculated. Included in the calculation of Xk1 and Xk2 is the previously calculated value of Yk.
8. Step 6 is repeated to obtain a more accurate value of Yk by using the previously calculated values of Xk1 and Xk2 in the re-calculation of Yk.
9. The load is removed from the scale whilst the scale is left at the tilted angle. Step 5 is then repeated to re-calculate the electronic offset 'Eoff' using equations 9 and 10 taking into account of Xk1, Xk2 and Yk.

The present inventors have found that the preferred calibration steps 1-8 above minimises the number of measurements and tilt adjustments required to implement the calibration methods disclosed in this application.

To demonstrate the invention, a weighing scale was fully calibrated according to the preferred example of the present invention. The calibrated scale was then used to measure the weight of a known 6 kg load on a scale tilted to 5 degrees to the horizontal along the Y axis. Without any error compensation at all, the load cell count output Wa equated to a load measurement of 5963 g which had an error of 37 g. When tilt compensation was applied to remove the electronic offset and compensate for the cosine dependence of the scale deadweight and applied load, the weighing scale gave an output for the applied load of 5996 g which still had an error of 4 g. When the correction factors were also applied to compensate for the load cell residual errors, the scale output a value of 6000 g.

The invention claimed is:

1. A method of calibrating a weighing apparatus, the weighing apparatus including a load cell, an inclinometer located in a defined position with respect to the load cell and a processor, the method comprising the steps of:
   applying a first mass to the load cell to measure a weight of the first mass;
   providing to the processor a first value associated with the weight of the first mass measured with the load cell at a first inclination value;
   measuring with the load cell at a second inclination from a horizontal level a second value associated with the weight of the first mass and providing the second value to the processor;
   measuring with the inclinometer a second inclination value associated with the load cell at the second inclination and providing the second inclination value to the processor;
   modifying, in the processor, the second value associated with the weight of the first mass in accordance with at least a first inclination relationship and the second inclination value to provide a modified second value;
   calculating, in the processor; an error parameter based at least upon:
   i) a comparison of the first value associated with the weight of the first mass, and the modified second value; and,
   ii) an error relationship between weight and load cell inclination; and
   using the error parameter to correct further measurements by the load cell of further masses after the weighing apparatus has been calibrated to produce a tilt compensated weight value of the further masses.

2. The method in accordance with claim 1 wherein the error parameter is calculated by further using:
   iii) the first value associated with the weight of the first mass; and
   iv) the second inclination value.

3. The method in accordance with claim 1 wherein the apparatus further comprises a storage device, the method further comprising step of:
   storing the error parameter in a storage device.

4. The method in accordance with claim 1 wherein the first inclination relationship is a cosine relationship.

5. The method in accordance with claim 1 wherein the error relationship is linear with respect to load cell inclination.

6. The method in accordance with claim 1 wherein the error relationship is linear with respect to weight.

7. The method in accordance with claim 1 further comprising the steps of:
   A) measuring with the load cell at the second inclination from the horizontal a third weight value corresponding to a second mass different to the first mass;
   B) modifying the third weight value in accordance with at least the first inclination relationship and the second inclination value;
   C) comparing the first value associated with the weight of the first mass, modified second value, and modified third weight value.

8. The method in accordance with claim 7 wherein the error relationship is quadratic with respect to weight.

9. The method in accordance with claim 1 wherein the error parameter is further based upon a previously calculated error parameter.

* * * * *